Dec. 9, 1924.     1,518,369
J. V. STOLP
VEHICLE WHEEL
Filed April 25, 1924
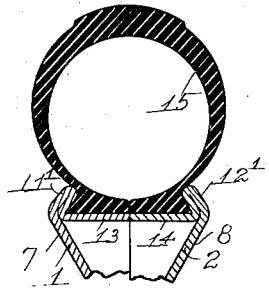
Fig. 4.
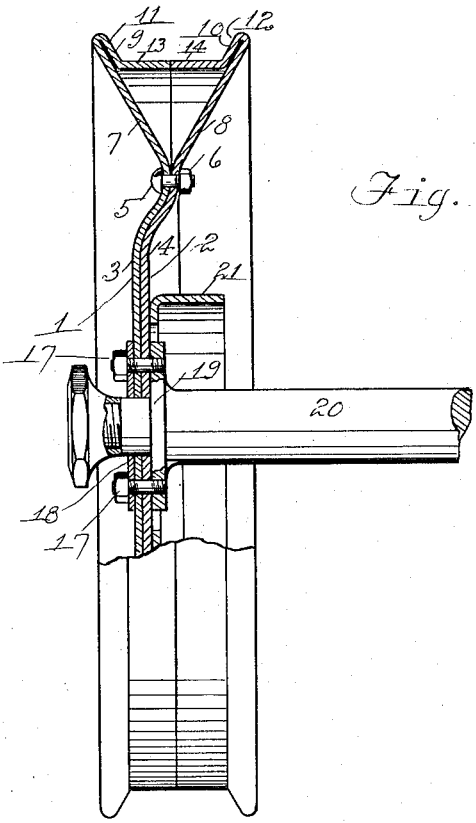
Fig. 1.
Fig. 2.
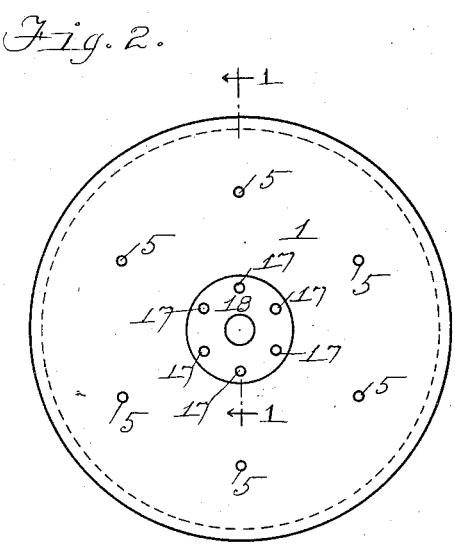
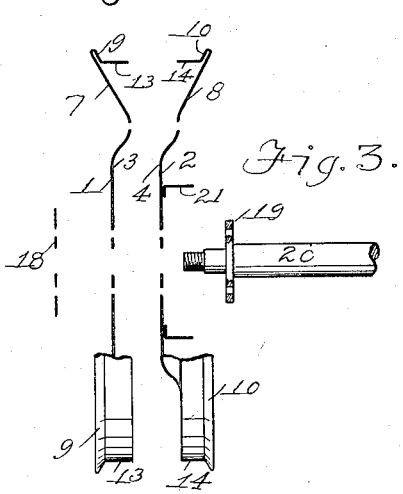
Fig. 3.
Inventor:
John Vander Stolp
by Cyrus W. Rice
Attorney
Witness:
Geo. L. Chapel Patented Dec. 9, 1924.

1,518,369

UNITED STATES PATENT OFFICE.

JOHN VANDER STOLP, OF GRAND RAPIDS, MICHIGAN.

VEHICLE WHEEL.

Application filed April 25, 1924. Serial No. 708,879.

*To all whom it may concern:*

Be it known that I, JOHN VANDER STOLP, a citizen of the United States, residing at Grand Rapids, in the county of Kent and State of Michigan, have invented new and useful Improvements in Vehicle Wheels, of which the following is a specification.

The present invention relates to vehicle wheels; and its object is, generally, to provide an improved demountable wheel for automobiles and the like; and further, to provide such a wheel having means for readily mounting and demounting the tire thereon; and further, to provide improved strengthening means for such a wheel; and further, to provide such a wheel having improved means for demountably applying a tire, not provided with a rim, thereto.

These and any other objects hereinafter appearing are attained by, and the invention finds preferable embodiment in, the structure hereinafter particularly described in the body of this specification and illustrated by the accompanying drawings, in which:—

Figure 1 is an edge view of a vehicle wheel applied to an axle, a portion of the wheel being sectioned on line 1—1 of Figure 2;

Figure 2 is an outer side view of said wheel, somewhat reduced in size;

Figure 3 is a view, partially diagrammatic in character, showing the parts of said wheel in assembling and disassembling relation; and Figure 4 is a sectional view of the peripheral portion of a wheel and tire thereon, showing a modified construction of the wheel, such section being taken on a plane in which lies the wheel's axle.

The automobile wheel, adapted to carry a pneumatic or solid rubber tire, shown in the views comprises a pair of circular disc members 1, 2, disposed in assembled position (seen in Figures 1 and 4) side to side. These members have laterally-bowed central portions 3, 4 respectively, these portions both being bowed outwardly toward the same side of the wheel, i. e., the outer side thereof seen at the left-hand side of Figure 1. These bowed central portions fittingly contact each other, as particularly seen in Figure 1, and are detachably connected as by the screw bolts 5 carrying nuts 6. It will be seen that this fitting contact of the disc members 1, 2 at their central bowed portions 3, 4 provides a wheel peculiarly strong and resistive to strains and thrusts in all directions. These disc members have peripheral annular portions which first diverge radially from each other at 7, 8; then extend reversely at 9, 10 toward the wheel's axis, thus forming tire-holding sides 11, 12 of the wheel; and then approach each other at 13, 14 parallelly with said axis, thus forming a base for the inner surface of the tire or its rim.

In the modified construction seen in Figure 4, the tire-holding sides $11^1$, $12^1$ are inclined toward each other outwardly, to thus more securely hold a tire 15 not provided with a rigid rim.

The two disc members 1, 2 are detachably mounted on the axle 20 of the wheel by suitable means, as by the screw-bolts 17 passing therethrough and through the outside ring plate 18 and threaded in the flange 19 of the axle 20. A brake flange 21 is shown, secured to the wheel, in Figure 1.

It is apparent that the entire wheel may be applied to and removed from the axle 20 by means of the bolts 17; and that the disc members 1, 2 may be connected and disconnected by means of the screw bolts 5, so that tires may be readily applied to and removed from the disc members, the relative positions of the parts in such assembling and disassembling being seen in Figure 3. The disc members may be formed from sheet metal bent into the forms shown.

I claim:

1. In a wheel of the character described: a pair of circular disc members disposed side to side and having laterally-bowed central portions detachably connected fittingly and peripheral annular portions first diverging radially and then mutually approaching parallelly with the wheel's axis.

2. In a wheel of the character described: a pair of circular disc members disposed side to side and having laterally-bowed central portions detachably connected fittingly and peripheral annular portions first diverging radially and then mutually approaching parallelly with the wheel's axis; means for detachably mounting said members on the axle of the wheel.

3. In a wheel of the character described: a pair of circular disc members disposed side to side and having laterally-bowed central portions detachably connected fittingly and peripheral annular portions first diverging radially, then extending reversely to form tire-holding sides of the wheel, and then mutually approaching parallelly with the wheel's axis.

In testimony whereof I have hereunto set my hand at Grand Rapids, Michigan this 21st day of April, 1924.

JOHN VANDER STOLP.